United States Patent Office 3,759,843
Patented Sept. 18, 1973

3,759,843
NICKEL CATALYSTS
Ebo Jan Holscher, Vlaardingen, Netherlands, and Theo Jan Osinga, Cleves, Germany, assignors to N.V. Internationale Octrooi Maatschappij "Octropa," Rotterdam, Netherlands
No Drawing. Filed Dec. 17, 1971, Ser. No. 209,436
Claims priority, application Great Britain, Dec. 21, 1970, 60,499/70
Int. Cl. B01j 11/22, 11/32
U.S. Cl. 252—459                                            5 Claims

ABSTRACT OF THE DISCLOSURE

A process for preparing a supported nickel catalyst is described in which precipitation of the nickel on the support occurs by mixing an aqueous solution of a nickel salt, an aqueous alkali metal carbonate and the support to form a suspension which during the whole of the precipitation is between 75° C. and 95° C., is at a pH between 8.0 and 10 and has an alkalinity between 0.010 N and 0.2 N.

---

The invention relates to the preparation of a nickel-based catalyst. Nickel-based catalysts are very widely used, particularly as hydrogenation catalysts. Such catalysts are often supported catalysts.

It has been proposed to precipitate nickel hydroxide from an aqueous solution of a nickel salt using aqueous alkali metal carbonate. A support material can be present during the precipitation or can be added later. Materials that can be used as supports include aluminas and silicas (e.g. silica-containing materials), such as kieselguhrs.

It has now been found that an improved nickel-based catalyst is obtained if precipitation occurs by mixing the aqueous solution of the nickel salt, the aqueous solution of an alkali metal carbonate and the support material such that throughout the precipitation a suspension is formed with a temperature in the range 75° C. to 95° C., preferably 80° C. to 90° C., and a pH of 8.0 to 10, preferably 8.5 to 9.5, and the suspension is separated after precipitation, preferably by filtration. After separation the suspension is preferably washed. The support material can be added (a) directly, (b) in suspension in water, (c) preferably, in suspension in the aqueous solution of the nickel salt or (d) in suspension in the alkali metal carbonate solution. When the support material is added in suspension in the sodium carbonate solution, preferably care must be taken to ensure that the support material and the alkali metal carbonate are not in contact for an undue time, preferably less than 5 minutes. For convenience sodium carbonate is the preferred alkali metal carbonate.

When the support material is a silica, the weight ratio of Ni to $SiO_2$ is preferably between 0.5 and 4, particularly preferably between 2 and 3.

Preferably the temperature is within a range of not more than 5° C. during the precipitation, particularly preferably not more than 2° C. The temperature can be achieved in any convenient manner, for instance by heating the suspension with steam-coils, blowing in steam or by using heated reactants. The pH is particularly preferably kept within the range 9.0–9.2. The pH referred to throughout is the pH of filtrate cooled to 25° C.

Another important parameter is the excess of alkali metal carbonate present during precipitation, called the alkalinity. This alkalinity should preferably be maintained between 0.010 N and 0.2 N. In a batch process the alkalinity is particularly preferably between 0.010 N and 0.1 N. In a continuous process the alkalinity is particularly preferably between 0.10 N and 0.15 N. The alkalinity is determined in the filtrate after cooling to 25° C. by titration with acid, using phenolphthalein as indicator. The rate of addition of the reactants, for instance the addition of nickel salt or the addition of alkali metal carbonate, can be used to control the alkalinity of alkali metal carbonate. The alkalinity should preferably be kept constant. A continuous process is preferred.

The nickel salt used is preferably nickel sulphate. Nickel nitrate, acetate, chloride and formate are possible other nickel salts. The normality of the salt solution is preferably between 0.5 and 3.0, particularly preferably between 1.5 and 2.0.

In a continuous process the suspension preferably has a mean residence time of less than 60, preferably between 5 and 20 and especially between 7 and 15 minutes, in a mixing vessel, where at least most of the precipitation occurs, and is then separated, preferably by filtration, to give the catalyst. The time after the suspension leaves the mixing vessel and before separation is preferably less than 15 minutes.

The suspension preferably should be at a temperature in the range 75° C. to 90° C. if it is filtered.

Preferred support materials are silicas, in particular silicas that are normally described as amorphous, i.e. silicas that contain, as estimated by X-ray diffraction, less than 50% of crystalline material. For such amorphous silicas the weight ratio of nickel to silica is preferably 2.0 or higher. When the crystalline content is higher, optimum catalysts can be prepared with lower weight ratios of nickel to silica, for instance from a weight ratio of 0.5.

A related property for which the above preferences apply is alkaline solubility. Thus for silicas with high, above 70%, alkaline solubility the weight ratio of nickel to silica is preferably above 2. For silicas with lower alkaline solubility lower weight ratios of nickel to silica are preferred, for instance from a weight ratio of 0.5.

Alkaline solubility is measured, for example, by stirring the silica at about 90° C. in 1 N sodium hydroxide solution and measuring the percentage dissolved after 10 minutes compared with sodium metasilicate taken as 100%.

As explained after precipitation and separation the catalyst is usually converted to an active form by, for example, drying and then activation using hydrogen and then, in appropriate cases, passivation using $N_2$/air. Such process steps are very well-known. It is to be understood that in this specification, when the context permits, the term catalyst includes both unactivated catalyst and activated catalyst.

Catalysts obtained by processes according to the invention are useful particularly as hydrogenation catalysts, for instance in the hydrogenation of aromatic compounds, such as benzene and phenol; methanation; fat hardening, including fatty acid hardening; reduction of nitrile and nitro compounds; reduction of aldehydes to alcohols; conversion of glucose to sorbitol; and reduction of sulpholene to sulpholane. The invention is described in the following examples, which also show further preferred features.

EXAMPLE 1

A suspension of an amorphous guhr in an aqueous solution of $NiSO_4$ (50 g. Ni/litre; 1.7 N; Ni/$SiO_2$=2½) and an aqueous solution of $Na_2CO_3$ (2 N) were continuously pumped into a stirred vessel at about equal rates. The suspension obtained was kept at a constant temperature of 90±2° C. The pH and the excess carbonate of the suspension were adjusted at constant values of 9.0–9.2 and 0.125±0.025 N, by regulation of the addition of the $Na_2CO_3$ solution.

The suspension had a mean residence time of 7 minutes. The suspension left the vessel continuously through an overflow and was filtered on a rotary drum vacuum filter and washed. The resulting wet green cake was dried and activated with hydrogen to give a catalyst according to the invention.

EXAMPLE 2

This example shows the activity of a catalyst according to the invention in methanation:

$$CO + 3H_2 \rightarrow CH_4 + H_2O$$

The catalyst used was prepared as described in Example 1 except that the $Ni/SiO_2$ ratio equalled 1.0; the guhr was a more crystalline guhr; the excess of sodium carbonate was $0.1 \pm 0.025$ N; and the average pH was 8.9. Table I shows the results obtained with the catalyst of the example and a commercial catalyst in a methanation test described below:

TABLE I

| Temp., °C. | Degree of conversion (percent) | |
|---|---|---|
| | Commercial catalyst A | Example 2 |
| 226 | (1) | (1) |
| 201 | 64 | 97.9 |
| 196 | 28.9 | |
| 194 | | 88.2 |
| 189 | 14.9 | |
| 185 | | 53.6 |
| 178 | | 30.9 |
| 172 | | 19.0 |

[1] Almost 100.

The conditions used in the test were as follows: Prior to reaction 1500 mg. of the catalyst was activated in a tube reactor for 4 hours at 450° C. under a 30 l./hour flow of $H_2$. A mixture of 0.1 ml./sec. CO and 4.5 ml./sec. $H_2$ was then passed through the tube containing the catalyst.

EXAMPLE 3

Catalyst from Example 1 was tested in the hydrogenation of benzene. The results are given in Table II.

TABLE II

| | Catalyst | |
|---|---|---|
| | Commercial catalyst B | Example 1 catalyst |
| Percentage nickel [1] | 42.6 | 45.5 |
| Specific Ni surface, m.²/g. Ni total [2] | 68 | 105 |
| Ni-surface, m.²/g. catalyst [2] | 28.9 | 47.7 |
| Degree of reduction, percent [3] | 90 | 94 |
| Activity (benzene) [4] | 0.5 | 1.1 |

[1] On dry catalyst before activation.
[2] The specific surface of nickel was determined by means of hydrogen chemosorption, cf. J. W. E. Coenen, Thesis Delft (Netherlands) 1958 and cf. B. G. Linsen, Thesis Delft (Netherlands) 1964.
[3] The degree of reduction (ratio reduced nickel/total amount of nickel) was obtained by reducing the composition under standard conditions (4 hours at 450° C., $H_2$ flow of 60 l./hr.) and determining the amount of nickel metal by treating the catalyst with acid, cf. B. G. Linsen, l.c.
[4] The benzene activity was determined by hydrogenation gaseous benzene using a known amount of catalyst under standard conditions e.g. temperature 70° C. The specific reaction rate (=benzene activity) is defined as the number millimoles benzene converted per minute per gram of nickel.

From the results given in this example it follows that the nickel catalysts according to the invention are superior to the best commercial prior art catalyst known.

EXAMPLES 4 to 28

The following examples demonstrate a range of process conditions, in particular of residence time, of time between precipitation and filtering, of dosing methods and of sodium carbonate concentration. In the standard preparation an amorphous kieselguhr was suspended in the nickel sulphate solution and pumped into a first reactor with a capacity of 1.8 l. The addition of the sodium carbonate solution was controlled by a magnetic value in such a way that during the precipitation a constant pH was maintained. The average residence time in the (first) reactor was 8 min.; in some examples 5 or 16 min. The precipitation temperature was 90° C. Sometimes a second reactor was used, in which the suspension from the first reactor was kept at 90° C. for 8 to 20 min. From a container hot water could be introduced into this second reactor to reduce the residence time from 20 to 10 min.

During the precipitation, samples were taken from the (first) reactor. In the filtrate the excess of carbonate was determined by titrating 10 ml. with 0.1 N HCl, using phenolphthalein as indicator. The usual alkalinity was 0.125 N, but it was also varied, by changing the pH.

The suspension volume present in 25 ml. of sample after 15 min. settling in a 25 ml. measuring flask (height 12.5 cm.) was also measured. An $Ni/SiO_2$ ratio in the catalyst of 2.5 was aimed at. After starting the continuous precipitation process, the desired process conditions were adjusted. As soon as constant alkalinity and residence time had been reached, the system was not changed and after at least 4 times the total mean residence time, the catalyst was sampled, filtered, washed with water and dried for 24 h. at 120° C. In some experiments the time required to such through the washwater was determined. Soft water was used.

Changes from these standard conditions are indicated in the following tables, which also give the results obtained.

TABLE III

| Example | Alkalinity | Precipitation time (min.) 1st reactor | Residence time (min.) 2d reactor | Settling test, ml. | Filterability | Ni/SiO₂ weight ratio found |
|---|---|---|---|---|---|---|
| 4 | 0.050 | 8 | | 11 | Tolerable | 2.55 |
| 5 | 0.050 | 8 | 8 | 11 | do | 2.57 |
| 6 | 0.050 | 16 | | 5.5 | Good | 3.49 |
| 7 | 0.050 | 16 | 16 | 5.5 | do | 3.03 |
| 8 | 0.075 | 8 | | 9.8 | Reasonable | 2.24 |
| 9 | 0.075 | 8 | 8 | 9.5 | do | 2.54 |
| 10 | 0.075 | 16 | | 7 | Very good | 3.15 |
| 11 | 0.075 | 16 | 16 | 7 | Good | 2.82 |
| 12 | 0.125 | 8 | | 5 | do | 2.72 |
| 13 | 0.125 | 8 | 8 | 6.5 | Very good | 2.79 |
| 14 | 0.125 | 16 | | 4.5 | Excellent | 3.07 |
| 15 | 0.125 | 16 | 16 | 4.5 | Very good | 2.69 |

From Table III it follows that an alkalinity of 0.125 gives the best catalysts with respect for instance to filterability and settling. At an alkalinity of 0.125 a residence time of 8 min. (Ex. 12) gave a catalyst with somewhat better activity than 16 min. (Ex. 14).

The precipitation time in Examples 16 to 20 was 8 minutes, except in Example 19 for which it was 6 minutes.

When the guhr was dosed in water in a separate stream, a precipitate with poor settling and a cake with a high water content (82%) was obtained (Ex. 18). With a mean residence time of 6 mins. under these conditions the catalyst properties decreased (Ex. 19). Dosing still more water also yielded a poor settling precipitate resulting in a wet cake (Ex. 20).

TABLE IV

| Example number | Ni-sulphate N | Ni-sulphate flow, ml./min. | Guhr | Guhr Flow, ml./min. | Sodium carbonate N | Sodium carbonate Flow, ml./min. | Filtrate Alkalinity, N ×10³ | Filtrate pH (25° C.) | Settling test (ml.) suspension | (¹) | Filtration Time (2 l. H₂O), min. | H₂O in cake (percent) |
|---|---|---|---|---|---|---|---|---|---|---|---|---|
| 16 | 1.2 | 80 | In Ni-sulphate | 0 | 2.1 | 154 | 122 | 9.1 | 6 | vg | 4.5 | 74 |
| 17 | 1.2 | 80 | ...do | 0 | 2.1 | 154 | 120 | 9.3 | 5.5 | vg | 5 | 68 |
| 18 | 1.2 | a | In water | a | 2.1 | | 122 | 9.2 | 14 | g | 6 | 82 |
| 19 | 1.2 | b | ...do | b | 2.1 | | 119 | 9.3 | 9 | mg | 7 | 78 |
| 20 | 0.86 | 90 | ...do | 70 | 2.1 | 75 | 122 | 9.2 | 17 | g | 6.5 | 83 |

¹ vg=very good; g=good; m=moderate.

NOTE.—a and b indicate that the flow-rates were not measured but the flow-rate of nickel sulphate solution was equal to the flow-rate of the guhr in water.

TABLE V

| Example number | Ni-sulphate N | Ni-sulphate Flow (ml./min.) | Guhr | Na-carbonate N | Na-carbonate Flow (ml./min.) | Filtrate Alkalinity, N ×10³ | Filtrate pH | Settling test (ml.) | (¹) | Filtration cake Wash time 2 l. H₂O, min. | Filtration cake H₂O (percent) | Filtration cake Hardness² | Ni/SiO₂, weight ratio found |
|---|---|---|---|---|---|---|---|---|---|---|---|---|---|
| 21 | 1.2 | 80 | In water, 80 ml./min. | 4 | 70 | 132 | 9.1 | 19 | t | 11 | 83 | | 2.67 |
| 22 | 1.2 | 118 | In Ni-sulphate | 4 | 102 | 123 | 9.1 | 14 | m | 9.5 | 71 | | 2.42 |
| 23 | 1.2 | 123 | In Ni-sulphate, 17 g/l. | 4 | 110 | 110 | 9.4 | 9 | t | 9.5 | 51 | 1 | 2.61 |
| 24 | 1.2 | 108 | ...do | 4 | 120 | 110 | 9.4 | 5 | m | 5.5 | 55 | 1 | 2.55 |
| 25 | 1.2 | 155 | ...do | 4 | 100 | 111 | 9.3 | 19 | jt | 9.2 | 61 | 4.5 | 2.66 |
| 26 | 1.2 | 132 | ...do | 4 | 110 | 111 | 9.3 | 8.5 | t | 14 | 71 | 2 | 2.55 |
| 27 | 3.3 | | In Ni-sulphate, 48 g/l. | 4 | | 130 | 9.5 | 18 | m | | 71 | 3 | 2.60 |
| 28 | 1.5 | | In Ni-sulphate, 23 g/l. | 6 | | 111 | 9.4 | 10 | m—g | | 69 | 2 | 2.41 |

¹ g=good; m=moderate; t=tolerable; J=just. ² 1=soft; 5=very hard.

The precipitation time in Examples 21 to 28 was 8 minutes.

Production capacity can be increased by using a 4 N sodium carbonate solution instead of 2 N. Using 4 N sodium carbonate precipitates were obtained that were slightly more difficult to filter. Dosing the kieselguhr separately in water resulted in a cake with 83% water (Ex. 21).

In the settling test a slow settling was observed but after dilution with water (Ex. 24) an improvement was found. Using 6 N sodium carbonate solution a still acceptable catalyst was obtained, at least after dilution (Ex. 28). The catalyst cake was hard, after drying. Using a very concentrated nickel sulphate solution (3.3 N) and 4 N sodium carbonate a catalyst of comparatively poor activity was obtained (Ex. 27).

With the 3.3 N nickel sulphate there was the additional difficulty that the feed-lines had to be heated. In examples 27 and 28 the qualities of the catalysts are still acceptable.

EXAMPLES 28 TO 38

The following examples demonstrate the activity of catalysts according to the invention in the liquid-phase hydrogenation of benzene.

The catalysts commercially available for the liquid-phase hydrogenation of benzene, see Table VII, were characterized as follows.

A: Ni-catalyst RCH 55/5, ex Hoechst, containing 50% Ni. Provided in reduced, non-pyrophoric condition.

B: Ground Ni-catalyst H1170, ex Houdry-Hüls, containing 12% Ni.

C: Ni-catalyst 0104P, ex Harshaw, containing 60% Ni.

D: Ground Ni-catalyst H1026, ex Houdry-Hüls, containing 32% Ni.

E: Ground Ni-catalyst H1031, ex Houdry-Hüls, containing 45% Ni.

F: Ni-catalyst G33, ex Girdler, containing 33% Ni.

The benzene hydrogenations were carried out in a 300 ml. autoclave (ex Magnes Drive), with a rotating stirrer, a cooling coil and a sampling tube. The amount of hydrogen absorbed during the hydrogenation was measured. Benzene analytical grade ex Merck with a purity of 99.5% was used. The thiophene content was 0.0005% and the sulphur content 1 p.p.m. For each example 125 g. benzene and 0.05–0.2% catalyst-metal were used. Most examples were carried out with 0.1% Ni-metal. During the hydrogenation the pressure in the autoclave was kept constant at 10 atm $H_2$ gauge pressure. The temperature and the stirring rate were kept constant at 200° C. and 1750 r.p.m. The examples were mostly stopped when the recorder indicated that 100% cyclohexane has been formed. The final refractive index $n_D^{25}$ was measured.

More detailed description of the conditions are given in Example 64.

Table VI shows results obtained with catalysts prepared according to the invention with different weight ratios of nickel to silica and reduced under various conditions.

TABLE VI

| Example | Catalyst of Example | Ni/SiO₂ ratio | Reduction Time in min. | Reduction Temp. in °C. | Reduction Flow H₂, m³/kg. Ni | 100% cyclohexane after min. | Starting rate in mg., mol/min. (benzene) | Index of refraction on $n_D^{25}$ at end |
|---|---|---|---|---|---|---|---|---|
| 29 | 44 | 2.4 | 30 | 450 | 7 | 59 | 35 | 1.4232 |
| 30 | 44 | 2.4 | 30 | 450 | 20 | 39 | 44 | 1.4234 |
| 31 | 50 | 2.8 | 30 | 450 | 7 | 88 | 25 | 1.4240 |
| 32 | 50 | 2.8 | 60 | 450 | 7 | 65 | 31 | 1.4233 |
| 33 | 40 | 1.0 | 30 | 450 | 7 | 86.5 | 22 | 1.4236 |
| 34 | 40 | 1.0 | 30 | 525 | 7 | 100.5 | 16.5 | 1.4234 |
| 35 | 39 | 0.7 | 30 | 450 | 7 | 108 | 17 | 1.4236 |
| 36 | 39 | 0.7 | 30 | 450 | 20 | 28 | 74 | 1.4236 |
| 37 | 39 | 0.7 | 30 | 525 | 7 | 75 | 24 | 1.4235 |
| 38 | 39 | 0.7 | 30 | 525 | 20 | 41.5 | 41.5 | 1.4235 |

Table VII shows results using the above listed commercial catalysts.

TABLE VII

| Catalyst | Reduction Time in min. | Reduction Temp. in °C. | Reduction Flow $H_2$, m.³/kg.Ni | 100% cyclohexane after min. | Starting rate in mg., mol/min. (benzene) | Index of refraction $n_D^{25}$ at end | Percent |
| --- | --- | --- | --- | --- | --- | --- | --- |
| A | 30 | 450 | (¹) | 80 | 24.5 | 1.4232 | |
| B | 30 | 450 | 7 | 41.5 | 40.5 | 1.4238 | |
| E | 30 | 450 | 7 | ²(90) | 4.5 | 1.4731 | 25 |
| D | 30 | 370 | 7 | ²(100) | 2 | 1.4836 | 14 |
| C | 30 | 450 | 7 | ²(120) | 12 | 1.4270 | 90.5 |
| C | | | | ²(97) | 12 | 1.4363 | 74 |
| F | 30 | 450 | 7 | ²(120) | 11.5 | 1.4361 | 74.5 |

¹ 150 l./hr.
² The content of cyclohexane is given in the last column.

EXAMPLES 39 TO 56

Table VIII presents conditions for catalyst preparation using varied weight ratios of nickel to silica. Amorphous kieselguhr was suspended in the nickel sulphate solution, containing about 5% Ni/l., and pumped into the reactor, capacity 1.8 l. The addition of the sodium carbonate solution, 2 N, analytical and technical grade was controlled by a magnetic valve in such a way that during the precipitation a constant pH was maintained.

In separate example, the temperature was kept constant at 90°, 80° and in some cases at 70° C. The average residence time was ca. 8 min.; in some examples 5 or 16 min. Also the Ni- concentration was varied.

During the precipitation, samples were taken from the reactor.

The alkalinity was also varied, by changing the pH. The suspension volume present in 25 ml. of sample after 15 min. settling in a 25 ml. measuring flask (height 12.5 cm.) was also measured.

After starting the continuous precipitation process, it was tried to reach the desired process conditions. When a constant alkalinity had been reached, the system was not changed and after waiting at least 4 times the means residence time, the catalyst was sampled, filtered, washed with an excess of water and dried for 24 hours at 120° C.

The influence of the alkalinity on the catalyst activity was slight in the range of 0.100–0.200 N. At alkalinity higher than 0.150 N, the system was difficult to keep at a constant alkalinity. In practice, it is recommended to maintain the alkalinity between 0.110 N and 0.130 N.

The investigation into the influence of the residence time (Table X) indicates that a mean residence time of 8 min. is optimal.

TABLE X

[Variation of the residence time 90° C., (Ni/SiO₂=2.5, alkalinity 0.125 N, 1.7 N-Nickel sulphate)]

| Example | Residence time, min. | Ni-SiO₂ ratio (g./g.) | Filter-ability ¹ | Settling test (ml. solids) | Catalyst activity ¹ |
| --- | --- | --- | --- | --- | --- |
| 54 | 5.5 | 2.55 | vg | 11 | vg |
| 55 | 8.4 | 2.33 | vg | 8 | e |
| 56 | 16 | 2.61 | vg | 7 | vg |

¹ vg=very good; e=exceptionally good.

EXAMPLES 60 TO 63

Three catalysts were prepared using identical conditions except that the concentrations of nickel sulphate were 1 N, 1.5 N and 2 N. No effect on activity was detected.

EXAMPLE 64

0.28 g. of a catalyst according to the invention, containing 44.5% nickel, was reduced at 450° C. in a flow of hydrogen (1.75 l./h.) for 0.5 hour. The reduced cat-

TABLE VIII

[Alkalinity 125, pH ca. 9.2 at 25° C., mean residence time 8 min., nickel sulphate solution 1.7N]

| | Precipitation at— | | | | | | | | | | | |
| --- | --- | --- | --- | --- | --- | --- | --- | --- | --- | --- | --- | --- |
| | 90° C. | | | | 80° C. | | | | 70° C. | | | |
| Example | Ni-SiO₂ ratio (g./g.) | Filter-ability ¹ | Settling test (ml. solid) | Catalyst activity ¹ | Ni-SiO₂ ratio (g./g.) | Filter-ability ¹ | Settling test (ml. solid) | Catalyst activity ¹ | Ni-SiO₂ ratio (g./g.) | Filter-ability ¹ | Settling test (ml. solid) | Catalyst activity ¹ |
| 39 | 0.71 | vg | 19.5 | p-m | 0.71 | g | 23 | m | | | | |
| 40 | 0.97 | vg | 20 | p-m | 0.96 | vg | 17 | m | 0.93 | m | 22 | p |
| 41 | 1.18 | vg | 15 | m | 1.15 | g | 17 | m | | | | |
| 42 | 1.46 | g | 13.5 | m | 1.45 | g | 12.5 | m | 1.54 | m | 24 | p |
| 43 | 1.76 | vg | 12 | vg | 1.78 | vg | 12.5 | vg | | | | |
| 44 | 2.41 | vg | 9 | g | 2.34 | vg | 11 | g | | | | |
| 45 | 2.52 | vg | 7 | g | 2.52 | g | 11 | vg | | | | |
| 46 | 4.4 | vg | 6 | vg | | | | | | | | |
| 47 | 5.4 | g | 6 | g | | | | | | | | |

¹ vg=very good; g=good; m=moderate; p=poor (after reduction at 450° C. and 4₂ flow of 7 m.³/kg. Ni).

Table IX demonstrates the effect of variation of alkalinity.

TABLE IX

[Variation of the alkalinity (90° C., res. time 8 min., 1.7 N-nickel sulphate)

| Example | Alkalinity, N ×10³ | Ni-SiO₂ ratio (g./g.) | Filter-ability ¹ | Settling test (ml. solids) | Catalyst activity ¹ |
| --- | --- | --- | --- | --- | --- |
| 48 | 97 | 2.46 | vg | 8 | vg |
| 49 | 122 | 2.41 | vg | 9 | vg |
| 50 | 130 | 2.81 | vg | 8 | vg |
| 51 | 156 | 2.53 | vg | 8 | vg |
| 52 | 198 | 2.30 | vg | 9 | vg |
| 53 | 205 | 2.98 | g | 9 | g |

¹ vg=very good; g=good.

alyst was then rinsed with 125 g. benzene analytical grade into an autoclave, equipped with stirrer, temperature regulator and cooling coil. The autoclave was closed, purged with nitrogen and heated to 200° C. At that temperature hydrogen was added to a partial pressure of 10 atm. and the pressure was kept constant by adding extra hydrogen. This quantity was measured. After 66 min. the rate of hydrogen uptake became nil and the autoclave contents were quickly cooled to 50° C. A sample taken from the autoclave was filtered and analysed. The refractive index at 25° C. was 1.4234. By means of gas-liquid chromatography it was found that the final product consisted of 99.7% cyclohexane.

EXAMPLE 65

Catalysts according to the invention show at least as high initial hydrogenation rates in the hydrogenation of phenol as well as of benzene as do commercially available catalysts.

Using the same procedure as given in Example 64, phenol was reduced to cyclohexanol. Conditions 125 g. phenol, chemically pure, 180° C., 30 atm. total pressure, 0.250 g. nickel reduced in a hydrogen flow of 3.5 l./h. at 450° C. during 0.5 h. The hydrogenation was broken off when no hydrogen was taken up, this was after 5 hours. After filtration the final product was analysed by means of gas liquid chromatography and found to consist of 99.6% cyclohexanol.

EXAMPLE 66

130 g. commercial fatty acid nitriles, prepared from tallow fatty acids and having an iodine value of 57.0 and free fatty acid content of 0.1% were used in this experiment. 1.3 g. of nickel in a catalyst according to the invention containing 44.5% Ni was reduced at 450° C. in a hydrogen flow of 50 l./h. during 1 h. An autoclave was filled with the 130 g. nitrile and the catalyst, closed and liquid ammonia was added. After heating to 130° C. the ammonia pressure was reduced to 10 atm. and the pressure was increased to 40 atm. by adding hydrogen and the pressure was kept at this level by supplying hydrogen. After 35 min. the hydrogen uptake stopped and the autoclave was cooled to 50° C. The pressure was released, the contents filtered and analysed. It was found that the primary amine content was 90% and the iodine value 48.

In a comparative experiment with the only difference being use of a commercial catalyst the hydrogen uptake stopped after 60 min. The product contained 90% primary amines and had an iodine value of 49.

EXAMPLES 67 to 83

The precipitation was carried out in a 3 l. vessel with good stirring. In this vessel 1 l. 0.4 N sodium carbonate solution was heated to 90° C. Then a suspension of guhr in 1.6 N nickel sulphate solution was introduced at a rate of 16.5 ml./min. or 33 ml./min. for precipitation times of 1 h. or 30 min., respectively. Via a pH-controlled solenoid 2 N sodium carbonate solution was simultaneously introduced. A few examples were carried out with guhr suspended in the 0.3 N sodium carbonate solution in the reactor.

In the first three examples a Radiometer, type TTT 1c, pH controller was used. With this meter it was difficult to obtain reproducible results. Then a new proportional pH controller was used: Radiometer, type 26, with Titrator, type 11, and magnetic relay, type MNR 1. The following pH electrodes were used: Glass, type G 202 BH, and reference, type K 4016. With this unit the reproducibility of the experiments was sufficiently good.

The precipitation was followed by taking samples of which the alkalinity was determined, after filtration.

In some examples the alkalinity was kept constant by decreasing the pH manually. In other examples the pH was kept constant.

After precipitation the precipitate was filtered, washed and dried at 120° C.

In the first examples 67, 68, 69, Table XI, but with amorphous kiesel-guhr at Ni/SiO$_2$ ratio of 2.5:1 was used. Adequate catalysts were obtained. In Examples 70 to 74 with the new pH controller, the alkalinity was kept constant. It was found that an alkalinity of 0.05 N is optimal with respect to activity. The sulphur content of the precipitates was very low, as was the sulphur content of continuously precipitated catalysts according to the invention.

For practical application a precipitation process at constant pH is somewhat easier to perform. In Examples 75 and 76 the pH was kept constant; the alkalinity varied around 0.050±0.025 N and 0.075±25 N, respectively. From these examples it follows that when the alkalinity varies around the optimal value of 0.050 N, acceptable catalysts can be obtained.

TABLE XI

[Precipitation of batch catalysts—precipitation time 1 hr., 90° C., amorphous guhr/NiSiO$_2$ ratio 2.5:1 in 1.6 N nickel sulphate, 16 ml./min. 110.3 N sodium carbonate in reactor, 2 N sodium carbonate added]

| | Precipitation | | Nickel (percent) | Ni/SiO$_2$ ratio (n:1) |
|---|---|---|---|---|
| Example number | Alkalinity, N ×10³ | pH in suspension [1] | | |
| 67 | 35–120 | 8.6–9.3 | 46.6 | 2.93 |
| 68 | 85–185 | 9.3 | 44.9 | 2.97 |
| 69 | 125 | 9.3–9.0 | 44.2 | 2.95 |
| Examples at constant alkalinity | | | | |
| 70 | 25 | 8.6–8.3 | 45.0 | 2.65 |
| 71 | 50 | 8.85–8.6 | 43.6 | 2.56 |
| 72 | 75 | 9.0–8.7 | 46.0 | 2.63 |
| 73 | 100 | 9.0–8.8 | 45.4 | 2.58 |
| 74 | 150 | 9.4–9.1 | 45.1 | 2.67 |
| Examples at constant pH | | | | |
| 75 | 38–74 | 8.6 | 45.1 | 2.53 |
| 76 | 54–94 | 8.7 | 45.9 | 2.67 |

[1] Radiometer titrator indicates the pH at 20° C.

Table XII shows the effect of varying the alkalinity. Note at a precipitation time of 30 min. somewhat worse results were obtained than at 1 hr.

TABLE XII

[Precipitation of batch catalysts—precipitation time 30 min. Constant alkalinity 1.6 N nickel sulphate, 30 ml./min.]

| | Precipitation | | Ni in cake (percent) | Ni/SiO$_2$ ratio (n:1) | Activity [1] |
|---|---|---|---|---|---|
| Example | Alkalinity, N ×10³ | pH approximately | | | |
| 77 | 25 | 8.4 | 45.0 | 2.45 | g |
| 78 | 50 | 8.6 | 45.2 | 2.39 | g |
| 79 | 75 | 8.8 | 45.3 | 2.44 | m |
| 80 | 100 | 9.0 | 44.9 | 2.57 | m |

[1] g=good; m=moderate.

With the kieselguhr previously suspended in the reactor, the optimal alkalinity appears to be less than 0.05 N, e.g. about 0.025 N (Table XIII). With the guhr suspended in the reactor it was somewhat more difficult to attain a constant pp-alkalinity.

The filterability of all the catalyst Ex. 67 to 83 was good.

TABLE XIII

[Precipitation with kieselguhr, previously suspended in the reactor—precipitation time 1 hr.]

| | Precipitation | | Ni in cake (percent) | Ni/SiO$_2$ ratio (n:1) | Activity [1] |
|---|---|---|---|---|---|
| Example | Alkalinity, N ×10³ | pH approximately | | | |
| 81 | 25 | 8.4 | 44.7 | 2.82 | g |
| 82 | 50 | 8.9 | 44.8 | 2.75 | m |
| 83 | 75 | 9.1 | 44.5 | 2.80 | m |

[1] g=good; m=moderate.

EXAMPLE 84

Example 1 was repeated except that nickel chloride (1.7 N) was used instead of nickel sulphate. The catalyst obtained had good filtration properties and in activity was adequate. Comparable catalysts can be obtained with other nickel salts such as nickel nitrate, nickel acetate and nickel formate.

EXAMPLE 85

Example 1 was repeated except that the nickel sulphate was 1.6 N; 2 N K$_2$CO$_3$ was used instead of Na$_2$CO$_3$; and the pH was 9.3. The catalyst had excellent filtration properties and good activity. Comparable catalysts can be obtained using other alkali metal carbonates.

What is claimed is:

1. An alkaline precipitation process for preparing a supported nickel catalyst in which an aqueous solution of a nickel salt, an aqueous solution of an alkali metal carbonate and a silica are mixed to form a suspension that, throughout the precipitation, (a) is within a 5° C. temperature range within the range 75° C. to 90° C., (b) is at a pH of 8.0 to 10.0, and (c) has an alkalinity between 0.01 N and 0.2 N to give a catalyst with a weight ratio of nickel to $SiO_2$ between 0.5 and 4.0.

2. A process according to claim 1 in which the silica is an amorphous silica and the weight ratio of nickel to $SiO_2$ is between 2 and 3.

3. An alkaline precipitation process for preparing a supported nickel catalyst according to claim 1 in which (a) the suspension is formed continuously in a mixing vessel in which the suspension has a mean residence of less than 60 minutes, and (b) the suspension is then filtered, the time between the suspension leaving the mixing vessel and the suspension being filtered being less than 15 minutes.

4. A process according to claim 3 in which the mean residence is between 7 and 15 minutes.

5. A process according to claim 3 in which the alkalinity of the suspension is between 0.1 N and 0.15 N.

References Cited
UNITED STATES PATENTS

| | | | |
|---|---|---|---|
| 3,649,563 | 3/1972 | Holscher et al. | 252—459 |
| 3,351,566 | 11/1967 | Taylor et al. | 252—452 |
| 2,436,923 | 3/1948 | Haensel | 252—459 X |
| 2,040,233 | 5/1936 | Adkins | 252—459 X |
| 3,472,787 | 10/1969 | Kucika | 252—459 X |

CARL F. DEES, Primary Examiner